United States Patent
Boies

(10) Patent No.: US 8,297,670 B2
(45) Date of Patent: Oct. 30, 2012

(54) IMPLEMENTS

(75) Inventor: David Boies, Levis (CA)

(73) Assignee: Garant GP, Saint-François (CA)

( * ) Notice: Subject to any disclaimer, the term of this patent is extended or adjusted under 35 U.S.C. 154(b) by 474 days.

(21) Appl. No.: 12/370,188

(22) Filed: Feb. 12, 2009

(65) Prior Publication Data

US 2009/0200813 A1 Aug. 13, 2009

Related U.S. Application Data

(60) Provisional application No. 61/028,278, filed on Feb. 13, 2008.

(51) Int. Cl.
*A01B 1/02* (2006.01)
*A01B 1/22* (2006.01)

(52) U.S. Cl. ............................ 294/57; 294/49

(58) Field of Classification Search ............ 294/49, 294/57

See application file for complete search history.

(56) References Cited

U.S. PATENT DOCUMENTS

| | | | | |
|---|---|---|---|---|
| 3,380,097 A | * | 4/1968 | Pharris | 15/145 |
| 5,743,577 A | * | 4/1998 | Newman et al. | 294/210 |
| 6,438,784 B1 | * | 8/2002 | Yu | 15/106 |
| 6,948,208 B1 | * | 9/2005 | Schlenner | 7/116 |
| 7,013,516 B1 | * | 3/2006 | Peters | 7/146 |
| 7,121,599 B2 | * | 10/2006 | Demar et al. | 294/60 |
| 2003/0184104 A1 | * | 10/2003 | Ping | 294/57 |
| 2005/0193876 A1 | * | 9/2005 | Broyles | 81/489 |

* cited by examiner

*Primary Examiner* — Dean Kramer
*Assistant Examiner* — Stephen Vu
(74) *Attorney, Agent, or Firm* — Goudreau Gage Dubuc; Gwendoline Bruneau

(57) ABSTRACT

An implement comprises a first member, at least a second member secured at one end of the first member; and at least one piece of material overlapping a junction between the first member and the second member. The implement is made by securing the second member at one end of the first member; and overlapping the junction between the first member and the second member with a piece of material smoothing a surface at the junction.

16 Claims, 2 Drawing Sheets

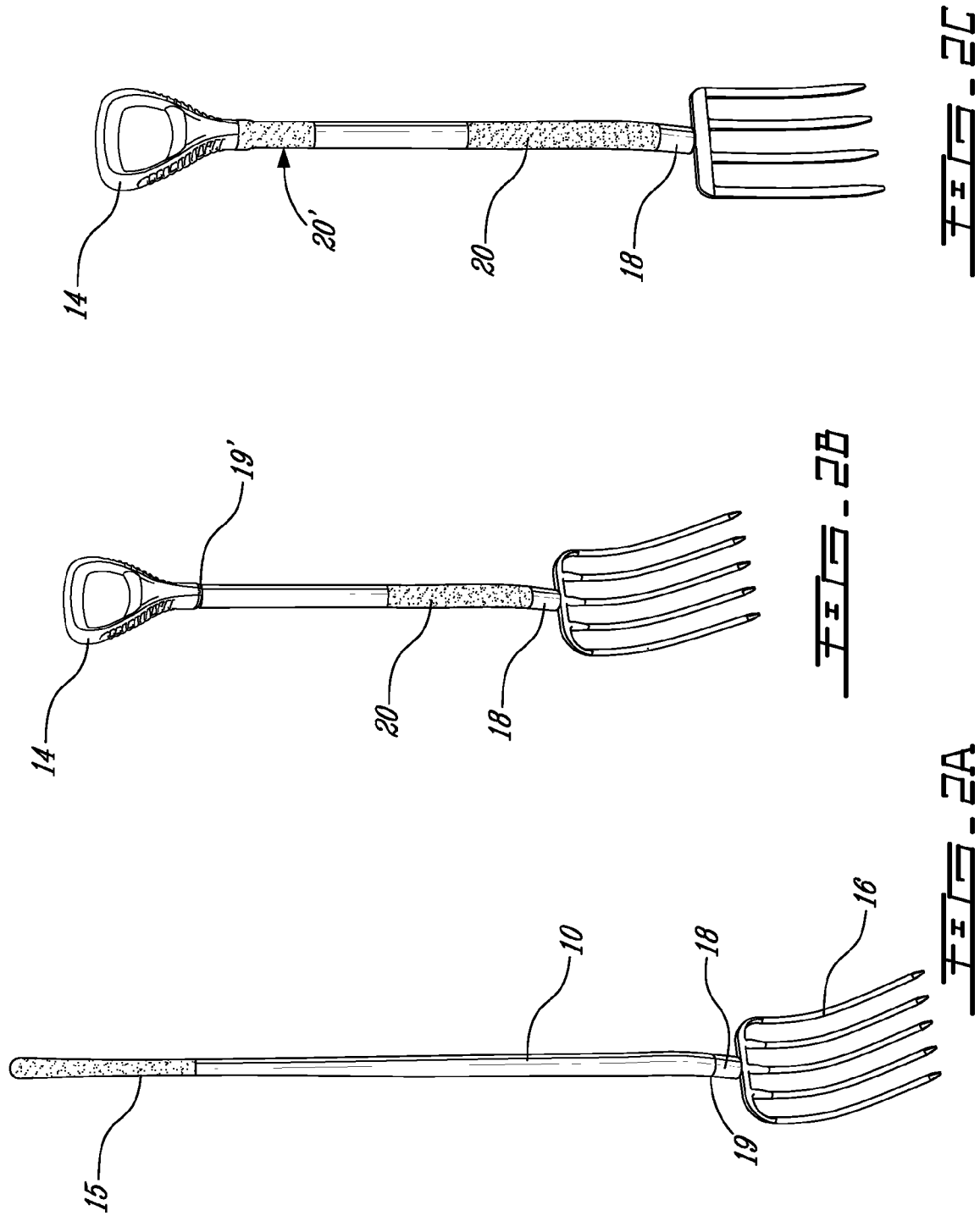

IMPLEMENTS

CROSS REFERENCE TO RELATED APPLICATIONS

This application claims priority on U.S. provisional application Ser. No. 61/028,278, filed on Feb. 13, 2008. All documents above are incorporated herein in their entirety by reference.

FIELD OF THE INVENTION

The present invention relates to implements. More specifically, the present invention is concerned with implements comprising a working part attached to a handling part.

SUMMARY OF THE INVENTION

More specifically, there is provided an implement, comprising a first member; at least a second member; the second member being secured at one end of the first member; and at least one piece of material overlapping a junction between the first member and the second member.

There is further provided a method for making an implement comprising a first member and at least a second member, comprising a) securing the second member at one end of the first member; and b) overlapping a junction between the first member and the second member with a piece of material smoothing a surface at the junction.

Other objects, advantages and features of the present invention will become more apparent upon reading of the following non-restrictive description of embodiments thereof, given by way of examples only with reference to the accompanying drawings.

BRIEF DESCRIPTION OF THE DRAWINGS

In the appended drawings:

FIG. 2 show a) a perspective view of an implement according to an embodiment of the present invention; b) a perspective view of an implement according to another embodiment of the present invention; and c) a perspective view of an implement according to a still further embodiment of the present invention.

DESCRIPTION OF EMBODIMENTS OF THE INVENTION

The present invention is illustrated in further details by the following non-limiting examples.

Figure 1C:
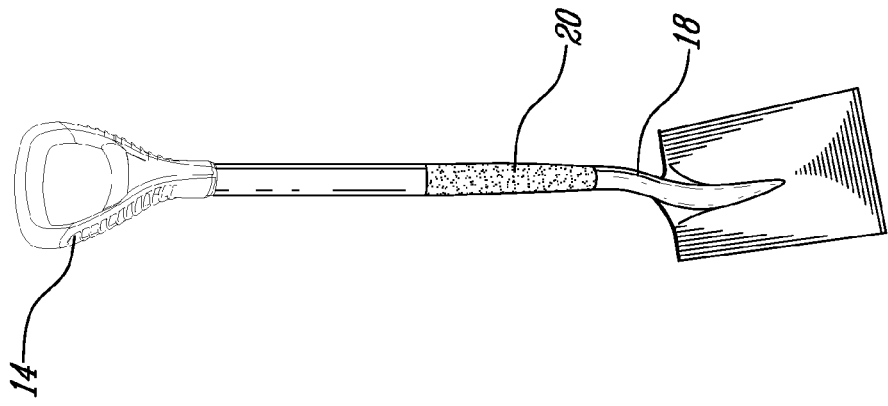
FIG. 1 show a) a front view; b) a side view; and c) a perspective view, of an implement according to an embodiment of the present invention.
Figure 1B:
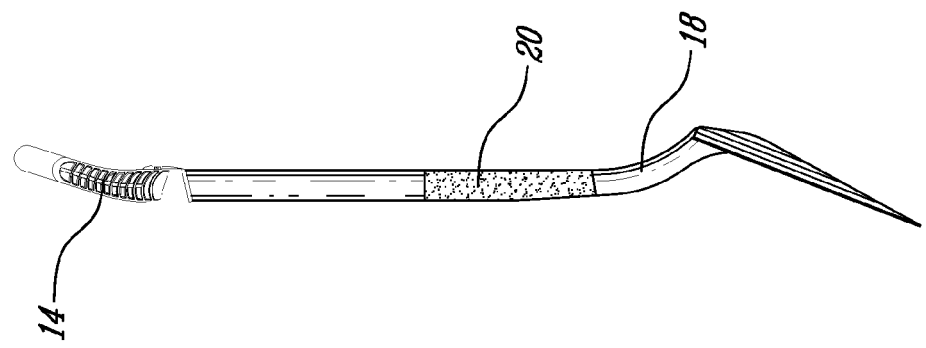
Figure 1A:
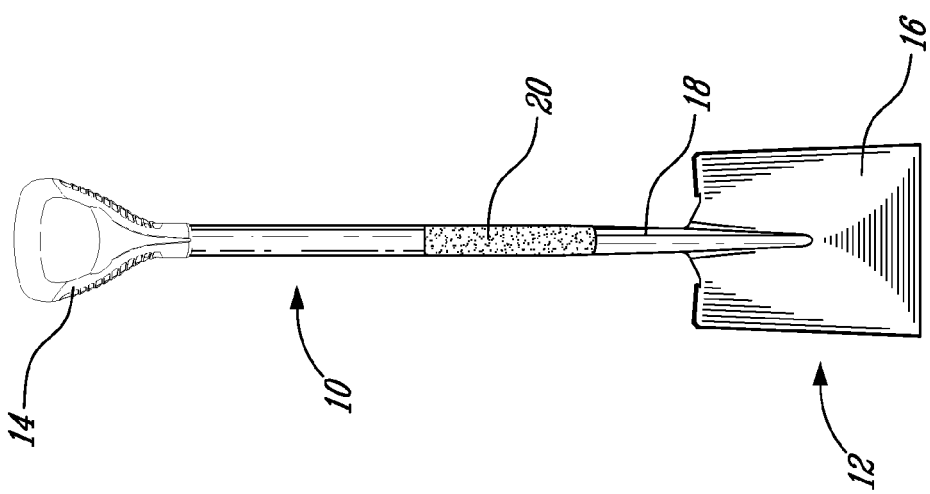

Implements as illustrated in FIGS. 1 and 2 typically comprise a handling member 10 and a working head 12.

The handling member 10 is typically for handling purpose of the implement. The handling member 10 may be made in a material such as wood, fiber glass, thermoplastic urethane, polyethylene, polypropylene, steel, aluminum and carbon fibers, for example.

For ergonomic and safety purposes, a hand grip 14 may be provided at the free end of the handling member 10, as shown in FIGS. 1, 2b and 2c. The hand grip 14 may be made in a third material, such as molded plastic or composite for example.

In FIG. 2a, the free end of the handle 12 is only provided with a gripping area 15, i.e. a portion covered by a material allowing a better grip, with anti-sudation properties for example.

The head 12 is typically secured to an end portion of the handling member 10 opposite a free end of the handling member 10. The head 12 usually comprises a working part 16, such as a blade in FIG. 1 or prongs in FIG. 2 for example, and a mounting part 18 for mounting to the end of the handling member 10 opposite the free end thereof.

The working part 16 is made in a material resistant to impacts and loads, such as steel, aluminum or reinforced plastic for example.

The mounting part 18 may have a tubular shape for example, for receiving the end of the handling member 10 opposite the free end thereof. Then, it may be secured to the handling member 10 by inserting the end of the handling member a little distance inside the tube and pressing the tube around the circumference of the handling member 10 so as to prevent the handling member 10 from moving therefrom.

The mounting part 18 may be a circumferentially full tube or a longitudinally cut tube, for example.

The mounting part 18 may alternatively, or further, be secured to the handling member 10 by rings and/or nail and/or rivet, as known in the art.

The implement illustrated in FIG. 1 is a shovel with a blade 16 having an integral tubular socket 18 for accommodating an elongated shaft 10.

The implements illustrated in FIG. 2 are spading forks comprising pronged forks 16 mounted to a shaft 10 by a mounting part 18. The mounting parts 18 are typically bushings in these implements.

As may be seen in FIG. 2a, the mounting part 18 surrounds the end of the handling member 10 and there is a junction 19 between the mounting part 18 and the shaft 10. Such a junction 19 may be a nuisance by hooking materials around, such as pieces of clothes of the user, when the implement is being used, and a source of injuries for the user through skin pinches, skin cuts, blisters, for instance.

In FIGS. 1, 2b, and 2c, a piece of material 20 covers such junction 19, thereby smoothing the surface at the region of the junction 19 between the handling member 10 and the head 12.

The material 20 may be a sleeve made in a shrinking material, first pulled on the end of the handling member 10 opposite the hand grip 14 or the free end thereof, and then pulled down on the mounting portion 18 once the handling member 10 is engaged in the mounting portion 18.

Alternatively, the sleeve 20 may be first pulled on the mounting portion 18 and then pulled up on the handling member 10 once the handling member 10 is engaged in the mounting portion 18. The sleeve 20 may then be heat-tightened around the junction 19.

The material 20 may also be a sheet of plastic material, wrapped around the junction 19 once the handling member 10 is secured to the mounting portion 18, and then heat-tightened around the region of the junction 19 to form a joining sheath.

The material 20 may also be a sheet of plastic material, wrapped and glued around the region of the junction once the handling member 10 is secured to the mounting portion 18, to form a joining sheath.

The material 20 may be molded over the junction 19.

The material 20 may comprise at least one of: a thermoset plastic, thermo formable plastic, thermo formable plastic rubber, reinforcement fibers, molded around the region of the junction 19 once the handling member 10 is secured to the mounting portion 18, to form a joining sheath.

When the implement is provided with a hand grip 14, as shown in FIGS. 1, 2b and 2c, a sleeve or sheath 20' of material may also be provided around the junction 19' between the handling member 10 and the hand grip 14 (see FIG. 1b for example), so as to smoothen this region (see FIG. 2c), and further provide enhance grip, with anti-sudation properties for example.

It will be apparent that the present invention is applicable to a range of implements wherein a working member, such as a blade, a hook, prongs etc. for example, is manipulated by leveraging with a joined shaft. For example, an implement constructed in accordance with the present invention could be configured as a spade having an iron blade adapted for pressing into the ground with the foot and a long shaft commonly with a grip or crosspiece at the top, or an edger, a round point shovel, a rake, a lawn rake, a hook, a scuffle hoe, a hoe, a draw hoe, a weeding hoe, etc.

Other gardening implements may be considered, such as small hand cultivators, dibbers, hand forks, weeders, trowels and the like.

Although the present invention has been described hereinabove by way of embodiments thereof, it may be modified, without departing from the nature and teachings of the subject invention as claimed.

What is claimed is:

1. An implement, comprising:
   a handling member;
   a hand grip fixedly secured at a first end of said handling member in alignment with said handling member;
   a first junction between said handling member and said hand grip; and
   a first sleeve overlapping said first junction between said handling member and said hand grip, said first sleeve being heat-tightened to both said handling member and said hand grip and smoothing a surface at a first region of said first junction between said handling member and said hand grip.

2. The implement of claim 1, comprising a working head fixedly secured at a second end of said handling member, a second sleeve overlapping a second junction between said handling member and said working head, said second sleeve being heat-tightened to both said handling member and said working head, and smoothing a surface at a region of said second junction.

3. The implement of claim 1, wherein said handling member is made in one of: wood, fiber glass, thermoplastic urethane, polyethylene, polypropylene, steel, aluminum and carbon fibers.

4. The implement of claim 1, wherein said hand grip comprises a mounting part; said hand grip being fixedly secured at the end of said handling member by said mounting part.

5. The implement of claim 1, wherein said hand grip comprises a mounting part; said hand grip being fixedly secured at the end of said handling member by insertion of said end of said handling member in said mounting part, and said mounting part being pressed around said end of said handling member.

6. The implement of claim 1, wherein said first sleeve, comprises at least one of: i) a shrinking material; ii) a plastic material, iii) a thermoset plastic, iv) a thermoformable plastic, v) a thermoformable plastic rubber and vi) reinforcement fibers.

7. An implement, comprising:
   a first member;
   at least a second member;
   at least a first junction between said first member and said at least second member, said second member being fixedly secured at one end of said first member in alignment with said first member; and
   at least one sleeve overlapping said junction between said first member and said second member, said at least one sleeve being heat-tightened to both said first and said second members and smoothing a surface at least a first region of said junction between said first member and said second member;
   wherein said first member is a handling member and said second member is one of: a working head and a hand grip; said implement comprising a hand grip fixedly secured at a first end of said handling member and a working head fixedly secured at a second end of said handling member; and at least one of i) a first sleeve overlapping, and heat-tightened to, both said handling member and said hand grip and smoothing a first junction between said handling member and said hand grip and ii) a second sleeve overlapping, and heat-tightened to, both said handling member and said working head, and smoothing a second junction between said handling member and said working head.

8. The implement of claim 7, wherein said working head is made in one of: steel, aluminum and reinforced plastic.

9. The implement of claim 7, wherein said handling member is made in one of: wood, fiber glass, thermoplastic urethane, polyethylene, polypropylene, steel, aluminum and carbon fibers.

10. The implement of claim 7, wherein said hand grip comprises a mounting part; said hand grip being fixedly secured at the end of said handling member by said mounting part.

11. The implement of claim 7, wherein said hand grip comprises a mounting part; said hand grip being fixedly secured at the end of said handling member by insertion of said end of said handling member in said mounting part, and said mounting part being pressed around said end of said first handling member.

12. An implement, comprising:
   a first member;
   at least a second member;
   at least a first junction between said first member and said at least second member, said second member being fixedly secured at one end of said first member in alignment with said first member; and
   at least one sleeve overlapping said junction between said first member and said second member, said at least one sleeve being heat-tightened to both said first and said second members and smoothing a surface at least a first region of said junction between said first member and said second member;
   wherein said first member is a handling member and said second member is one of: a working head and a hand grip; and wherein said hand grip is made in one of: i) a plastic material and ii) a composite material.

13. The implement of claim 12, wherein said handling member is made in one of: wood, fiber glass, thermoplastic urethane, polyethylene, polypropylene, steel, aluminum and carbon fibers.

14. The implement of claim 12, wherein said working head is made in one of: steel, aluminum and reinforced plastic.

15. The implement of claim 12, wherein said hand grip comprises a mounting part; said hand grip being fixedly secured at the end of said handling member by said mounting part.

16. The implement of claim 12, wherein said hand grip comprises a mounting part; said hand grip being fixedly secured at the end of said handling member by insertion of said end of said handling member in said mounting part, and said mounting part being pressed around said end of said handling member.

* * * * *